Figure 1:
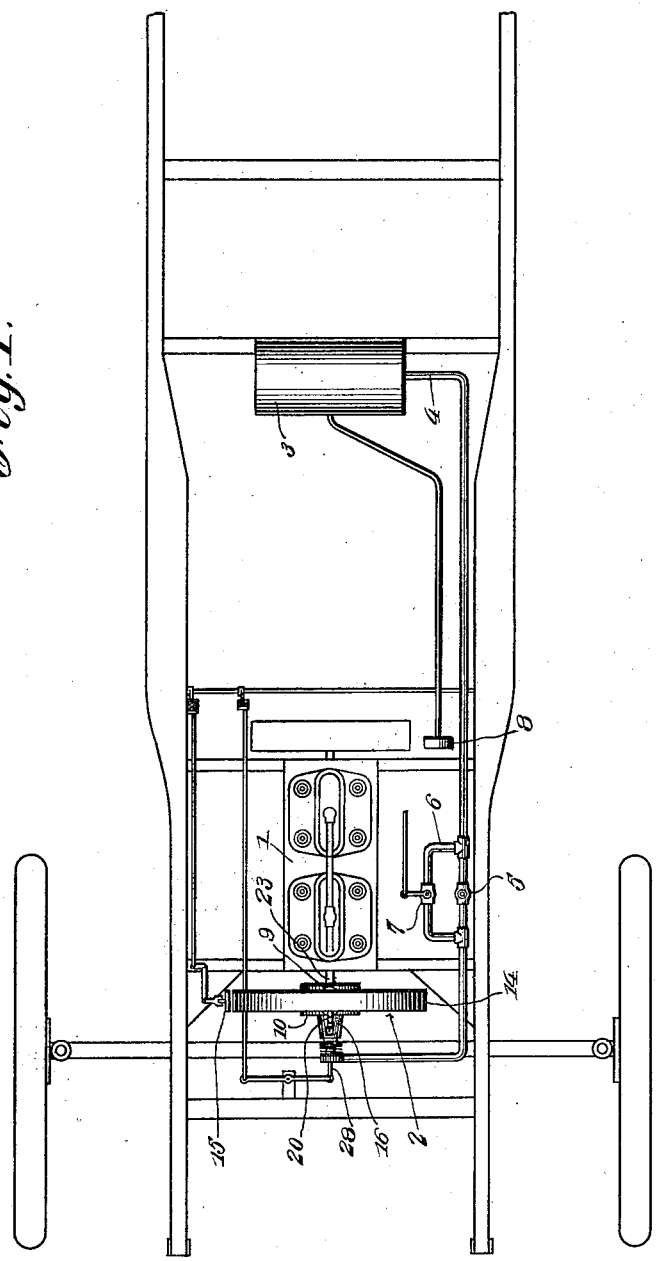

E. T. SCHMUCKER.
CONVERTIBLE MOTOR AND PUMP.
APPLICATION FILED SEPT. 9, 1913.

1,132,393.

Patented Mar. 16, 1915.
2 SHEETS—SHEET 1.

Witnesses
J. H. Crawford.
V. B. Hillyard.

Inventor
E. T. Schmucker,
By Victor J. Evans
Attorney

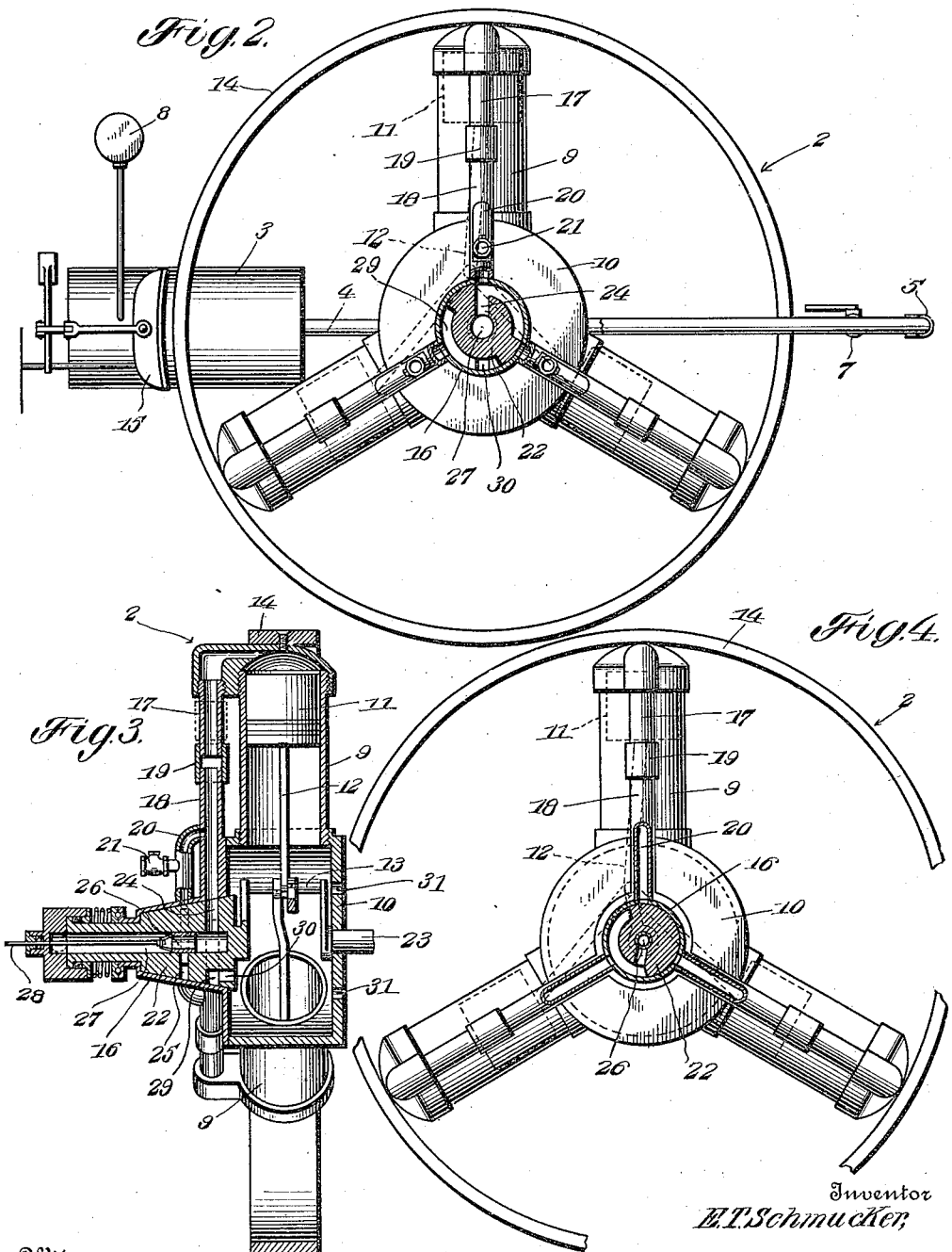

UNITED STATES PATENT OFFICE.

EARL T. SCHMUCKER, OF HAWARDEN, IOWA.

CONVERTIBLE MOTOR AND PUMP.

1,132,393.　　　　Specification of Letters Patent.　　Patented Mar. 16, 1915.

Application filed September 9, 1913. Serial No. 788,856.

*To all whom it may concern:*

Be it known that I, EARL T. SCHMUCKER, a citizen of the United States, residing at Hawarden, in the county of Sioux and State of Iowa, have invented new and useful Improvements in Convertible Motors and Pumps, of which the following is a specification.

The present invention provides novel means for starting an internal combustion engine without necessitating the cranking of the same by hand as commonly practiced, thereby avoiding the danger and the many inconveniences incident to starting such engines by hand.

The present invention utilizes a rotary motor as the primary source of power, said motor being driven by means of compressed air drawn from a storage tank or reservoir and said motor being further used as means for charging the tank or reservoir with air to replace such air as may be drawn therefrom.

While the invention is designed primarily for gasolene engines for driving mechanically propelled vehicles, such as automobiles, motor boats and the like, it is to be understood that it may be adapted for any type of internal combustion engine requiring to be initially started by power independently thereof.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view of a starting mechanism applied to an engine adapted for driving an automobile. Fig. 2 is a front view of the starting mechanism. Fig. 3 is a sectional view. Fig. 4 is a detail view, showing the relation of the parts of the motor when the same is used in the capacity of a compressor.

Corresponding and like parts are referred to in the following description, and indicated in all the views of the drawings, by the same reference characters.

The numeral 1 designates an internal combustion engine of the type generally employed for operating motor vehicles of the automobile type.

The starting motor is indicated by the reference numeral 2 and is mounted upon the crank shaft of the engine and is of the rotary type adapted to be operated by a fluid medium, such as compressed air.

A storage tank or reservoir 3 is conveniently located upon the frame or chassis of the machine and a pipe 4 connects the same with the motor to convey the compressed air thereto.

A check valve 5 is located in the length of the pipe 4, said check valve opening toward the tank 3 and closing toward the motor to prevent the air passing from the tank to the motor. A branch pipe 6 is looped into the pipe 4 and connects with the latter upon opposite sides of the check valve 5.

A valve 7 is located in the length of the branch pipe 6 to control the flow of the compressed air from the tank to the starting motor. The valve 7 is under control of the driver of the machine and when the engine is to be started the valve 7 is opened, thereby admitting of the compressed air passing from the tank to the motor. When the engine 1 is running it may be utilized as means for operating the starting motor whereby air may be forced into the tank 3 to replace that drawn therefrom for operating the motor when starting the engine. When the starting motor is used in the capacity of an air compressor the valve 7 is closed, the charges of air being forced by the check valve 5 into the tank 3. After the tank 3 has been charged to the requisite number of pounds pressure per square inch, which may be shown by means of an indicator 8 connected therewith, the starting motor may be released and allowed to run free.

The starting motor consists of an engine of the rotary reciprocating type and embodies a plurality of radially disposed cylinders and pistons arranged to reciprocate therein, said pistons having the inner ends of their rods connected to a crank which has connection with the crank shaft of the engine. The cylinders of the motor are indicated at 9 and are attached at their inner ends to a casing 10. The pistons 11 have the inner ends of their rods 12 connected with a crank 13, which is attached to the crank shaft of the engine. When the cylinders 9 are held against rotation and motive medium is supplied thereto for operating the pistons 11 the crank 13 is turned, thereby imparting movement to the crank shaft of the engine so as to start the same.

Should it be required to use the starting motor in the capacity of an air compressor when the engine 1 is running it is necessary only to hold the cylinders 9 from rotating when the pistons 11 will be caused to reciprocate therein by the action of the engine, thereby compressing air in the cylinders, said compressed air being led to the tank 3 by way of the pipe 4. The outer ends of the cylinders 9 are connected by means of a circular band or ring 14 and a brake shoe 15 is arranged to engage the band or ring 14 in such a manner as to hold it and the cylinders from rotating when required. The brake shoe 15 is under control of the operator of the machine and may be thrown into or out of action as required. It is to be understood that when the starting motor is used as an air compressor, the valve is required to be shifted so that air will be drawn into the cylinders 9 upon the instroke of the pistons and will be compressed upon the outstroke of such pistons. When the starting motor is used as means for giving the initial movement to the engine for starting the same the valve mechanism is set so that the compressed air or other fluid motive medium admitted into the cylinders 9 will force the pistons inwardly, the outstroke of the pistons serving to scavenge the cylinders preliminary to admission of the next charge of compressed air. The valve may be shifted in any manner and is held stationary in the adjusted position.

A valve casing 16 is located at one side of the casing 10 and is of tapering form. A plurality of tubes connect the valve casing 16 with the outer ends of the cylinders 9. Each of these tubes comprises an outer section 17 and an inner section 18, the two sections being connected by means of a coupling sleeve 19 preferably of rubber which may be slipped upon either section of the tube to admit of the cylinders being disconnected from the ring 14 and casing 10. Branch tubes 20 connect the inner sections 18 with the valve casing 16, each of such branches being provided with a check valve 21, which is adapted to open inwardly to admit air into the tube 20 when the motor is used as a compressor, but which valve closes outwardly to prevent any escape of the motive medium when the motor is used for turning the engine. A tapering plug valve 22 is fitted within the valve casing 16 and is connected with the crank 13 so as to rotate with such crank and the engine shaft 23. The valve 22 has two passages 24 and 25 at different points in its length to register with the tubular members 18 and 20. A sleeve valve 26 is slidably mounted in an axial bore or opening 27 of the valve 22 and is adapted to be operated by means of a rod 28. When the sleeve valve 26 is moved to the position indicated in Fig. 3 so as to cover the end of the passage 25 opening into the bore 27 the motive medium passes to the outer ends of the cylinders 9 in sequence, thereby operating the motor to turn the engine. When the valve 26 is moved so as to cover the end of the passage 24 leading into the bore 27 the engine is adapted for use as a compressor, the air being drawn through the check valves 21 of the tubes 20 and passing into the outer ends of the cylinders in which it is compressed and forced into the tank 3 through the main and branch tubes and the bore of the valve 22. The pipe 4 connects with the outer end of the bore 27.

A passage 29 is formed in the valve 22 opposite and in the plane of the passage 24 and has an opening 30 leading into the casing 10 to discharge the exhaust from the cylinders into the casing. Openings 31 are formed in a side of the casing 10 for the escape of the exhaust and to act as breathers for the cylinders when the engine is in operation. The passage 29 is adapted to make connection with the inner sections 18 of the tubular connections between the outer ends of the cylinders and the valve casing 16 to receive the exhaust at the proper time.

It is to be understood that when the device is used as a motor or pump, the cylinders are held stationary by means of the brake 15 in the manner stated. When used as a motor for starting the engine, the valve 7 is opened so that the compressed air or motive medium from the tank 3 may pass through the pipe 4 and branch 6 to the bore 27 of the valve 22. The valve 26 is moved so as to close the passage 25 and uncover the passages 24 and 29. The motive medium passing through the valve 26 enters the passage 24 and passes therefrom into the section 18 of the tubular connection in communication with such passage. The motive medium entering the section 18 passes therethrough and through the coupling 19 and section 17, thence into the outer end of the cylinder with which the tubular connection is in communication with the result that the piston is forced inward thereby turning the crank 13. One of the other cylinders is at the same time exhausting through the tubular connection in communication therewith into the passage 29 and opening 30 into the casing 10, thence outward through the openings 31. The piston receiving the direct force of the motive medium imparts a rotary movement to the crank 13 and the valve 22, hence the passage 24 is caused to communicate consecutively with each of the sections 18 of the tubular connections between the valve casing 16 and the cylinders so that the pistons are positively operated in sequence. At the same time the exhaust passage 29 is caused to register with the sections 18 of the tubular connections so as to carry off the exhaust from the cylinders in which the pistons are moving outward. When the device is used as a pump or compressor the valve 26 is moved so as to close the passages 24 and 29 and uncover the passage 25 and the valve 7 in the branch pipe 6 is likewise closed. Power being applied to the shaft 23 to rotate the crank 13, the pistons 11 are caused to move positively in each direction. Upon the instroke of a piston, air is drawn into a cylinder through the check valve 21, branch 20, and section 18 of the tubular connection between such branch and cylinder. At this time, the valve 22 occupies a position with the passage 25 out of register with the branch 20 through which the air is drawn into the cylinder. Upon the outstroke of the piston, the charge previously drawn therein is compressed and is forced into the tubular connection between such cylinder and the valve casing 16 and passes from such tubular connection into the branch 20, thence through the passage 25 into the opening 27 of the valve 22, thence through the pipe 4 into the tank 3. Upon the outstroke of the piston the valve 22 occupies a position with the passage 25 in register with the branch 20 through which the air compressed in the cylinder passes.

From the foregoing it will be understood that in using the device either as a motor or pump, the cylinders are held stationary by means of the brake shoe 15 and band 14. When the engine is running, the brake shoe is moved so as to clear the band 14 thereby admitting of the device rotating freely with the shaft 23 of the engine. This does not materially detract from the power of the engine or add to the load thereof and in some instances may be of advantage in causing the engine to run steady.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:

1. A combined motor and compressor, the same comprising a plurality of cylinders connected and mounted to rotate, means for holding the cylinders stationary when the device is working, pistons arranged to reciprocate within the cylinders, a shaft in line with the axis, about which the cylinders rotate and having a crank portion with which the said pistons are connected, a casing rotatable with the cylinders and having connection with the outer ends thereof, a plug valve mounted within the said casing and having connection with the before mentioned shaft to rotate therewith, and a second valve movable within the plug valve and adapted to direct the motive medium to the cylinders or the compressed air from such cylinders.

2. A combined motor and compressor comprising a plurality of cylinders connected to move in unison and mounted to rotate, means for holding the cylinders stationary when the device is working, pistons arranged to reciprocate within the cylinders, a shaft in line with the axis of the cylinders and having a crank portion with which the said pistons are connected, a casing rotatable with the cylinders and having connection with the outer ends thereof, a plug valve mounted within the casing and rotatable with the before mentioned shaft and having openings, and a second valve movable with reference to the plug valve to control the openings thereof to admit of the device being utilized either as a motor or compressor.

3. A combined motor and compressor, the same comprising a plurality of connected cylinders mounted to rotate, means for holding the cylinders stationary when the device is working, a shaft in line with the axis of the cylinders and having a crank, pistons arranged to operate in the cylinders and having connection with the said crank, a valve casing rotatable with the cylinders and having connection with the outer ends thereof, branch tubes having check valves in their length and forming connecting means between the valve casing and the connecting means between such valve casing and the outer ends of the cylinders, a plug valve mounted in the valve casing and connected with the before mentioned shaft and provided with openings to register with the branch tubes and the main connections between the valve casing and cylinders and a second valve movable in the plug valve for controlling the openings thereof.

In testimony whereof I affix my signature in presence of two witnesses.

EARL T. SCHMUCKER.

Witnesses:
A. D. HORTON,
R. L. BROOKS.